United States Patent [19]

Moore

[11] Patent Number: 4,752,824

[45] Date of Patent: Jun. 21, 1988

[54] PARALLAX CORRECTION APPARATUS FOR A HEAD-UP DISPLAY

[75] Inventor: William T. Moore, Buckhurst Hill, England

[73] Assignee: Rank Pullin Control Limited, Loughton, England

[21] Appl. No.: 28,505

[22] Filed: Mar. 20, 1987

[30] Foreign Application Priority Data

Mar. 20, 1986 [GB] United Kingdom ............. 8606877

[51] Int. Cl.$^4$ ............................................. H04N 7/18
[52] U.S. Cl. .................................. 358/103; 358/250; 350/174; 340/705
[58] Field of Search ............... 358/103, 113, 250, 104, 358/107, 109, 139; 350/174; 340/705, 980

[56] References Cited

U.S. PATENT DOCUMENTS

| | | | |
|---|---|---|---|
| 4,400,731 | 8/1983 | Brown | 358/250 X |
| 4,632,508 | 12/1986 | Connelly | 358/103 X |

FOREIGN PATENT DOCUMENTS

| | | |
|---|---|---|
| 1285554 | 8/1972 | United Kingdom . |
| 1310659 | 3/1973 | United Kingdom . |
| 2149258A | 6/1985 | United Kingdom . |

Primary Examiner—Howard W. Britton
Assistant Examiner—Victor R. Kostak
Attorney, Agent, or Firm—Saidman, Sterne, Kessler & Goldstein

[57] ABSTRACT

Thermal imaging apparatus particularly but not exclusively for use on an aircraft with a head-up display is provided with signal processing means which progressively expands or compresses the image in the vertical and/or horizontal direction to compensate for parallax arising from the difference in the positions of the observer and the scanner. The adjustment is performed; in the preferred embodiment, as a function of height of the aircraft.

8 Claims, 5 Drawing Sheets

PARALLAX CORRECTION APPARATUS FOR A HEAD-UP DISPLAY

This invention relates to imaging apparatus and is particularly applicable to such apparatus involving a so-called "head-up" display for use on vehicles, such as aircraft.

Head-up displays are particularly useful in conjunction with thermal imagers, since the user of the apparatus, for example the pilot of an aircraft, may, in fog or at night for example, look through the display and see a representation on the display of the land ahead of and/or below him. This is particularly useful for landing purposes. However, a serious problem is that parallax errors arise whereby points on the ground appear on the display at positions displaced from those at which they would appear if seen directly by the pilot's eye. Thus, if the image scanner is located below the fuselage of an aircraft the ground may appear on the display to be closer than it actually is. Further, the image on the display of parallel lines on the ground, such as the edges of a runway, will converge at an angle different from that at which they would appear to converge to the pilot's eye, due to the difference in height between the pilot's eye and the scanner.

The object of the invention is to reduce one or other or both of these forms of error.

The invention will be described by way of example with reference to the accompanying drawings, in which.

Figure 1:
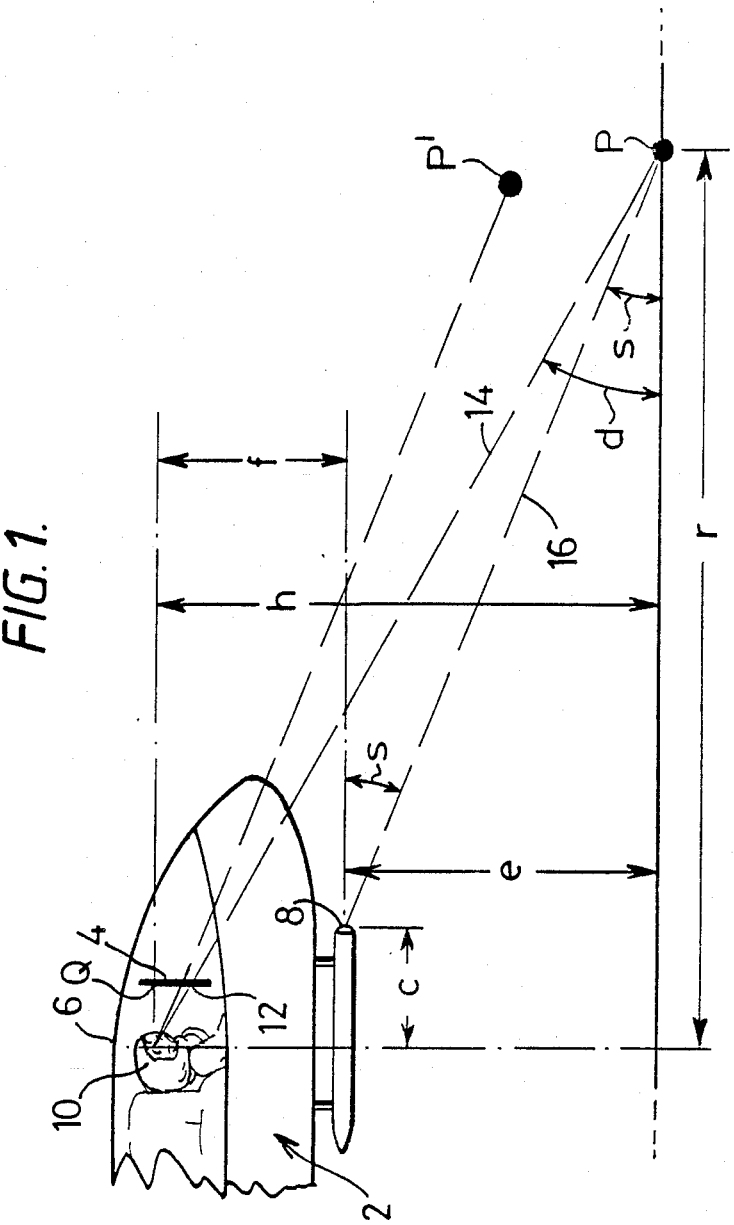
FIG. 1 is a diagram illustrating the way in which parallax errors may arise.

With reference to FIG. 1 an aircraft indicated generally at 2 has a head-up display 4 in its cockpit 6 and a thermal imager 8 located beneath the fuselage. The pilot 10 looks through the head-up display 4, on which is produced an image of the ground ahead of and below the aircraft as seen by the thermal imager 8.

A point P on the ground as seen directly by the pilot 10 is viewed through a position 12 on the head-up display 4, the position 12 being the point where the line 14 joining the pilot's eye to the point P intersects the head-up display 4. Thus, diagram A of FIG. 2 illustrates the position 12 close to the bottom of the head-up display 4.

The position at which the image of point P produced by the thermal imager 8 appears on the head-up display 4 is a function of the angle s which a line joining the scanner 8 and the point P makes with the horizontal, this line being indicated by reference number 16. The angle d between the line 14 and the horizontal is different from the angle s and as a consequence the position 12' (FIG. 2B) at which the image of point P appears on the display 4 is higher than the position 12. Thus, to the pilot 10, the point P as displayed appears to be at P' so that the ground appears closer than it actually is. The vertical distance between levels 12 and 12' on the display 4 is a function of r (the horizontal distance between the scanner 8 and the point P), the height of the aircraft above the ground, the distance c of the scanner 8 ahead of the pilot 10 and the vertical distance f between the pilot's eye and the scanner 8. To illustrate the effect of variations in r, diagram A of FIG. 2 indicates a further position 18 on the display, through which the pilot sees a further point (not shown) on the ground substantially further ahead than point P. Diagram B of FIG. 2 shows at 18' that the image of this further point on the display 4 produced by the thermal imaging device is at a level higher than position 18 but the difference between levels 18 and 18' is less than that between levels 12 and 12'. Diagrams A and B also show the horizon 20 and as can be seen both the actual horizon as seen by the pilot and its image as produced by the thermal imaging device appear at the same level.

Figure 3:
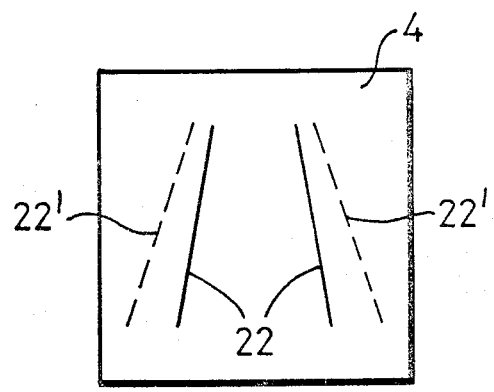
FIG. 3 illustrates a second form of parallax error.

As shown in FIG. 3, the edges 22 of a runway which the aircraft is assumed to be approaching appear to converge as shown by broken lines. The image of the edges of the runway 22' as produced by the thermal imaging means converged more sharply due to the fact that the thermal imager is located at a lower level than the pilot's eye.

Figure 2:
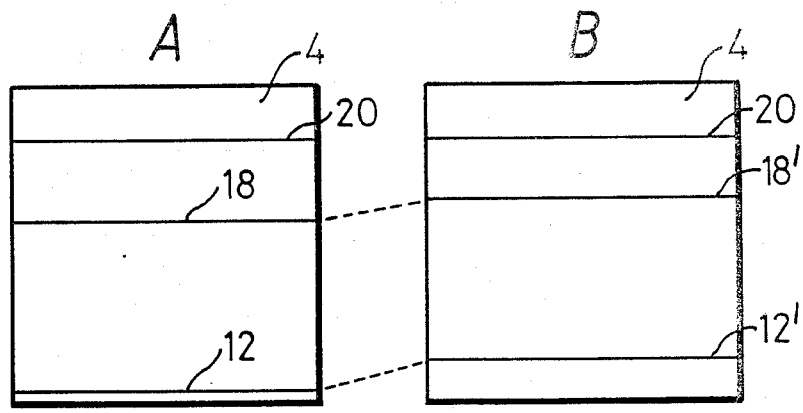
FIG. 2 illustrates a first form of parallax error.

The invention compensates at least partially for the distortion shown in FIG. 2 and/or FIG. 3.

Figure 4:
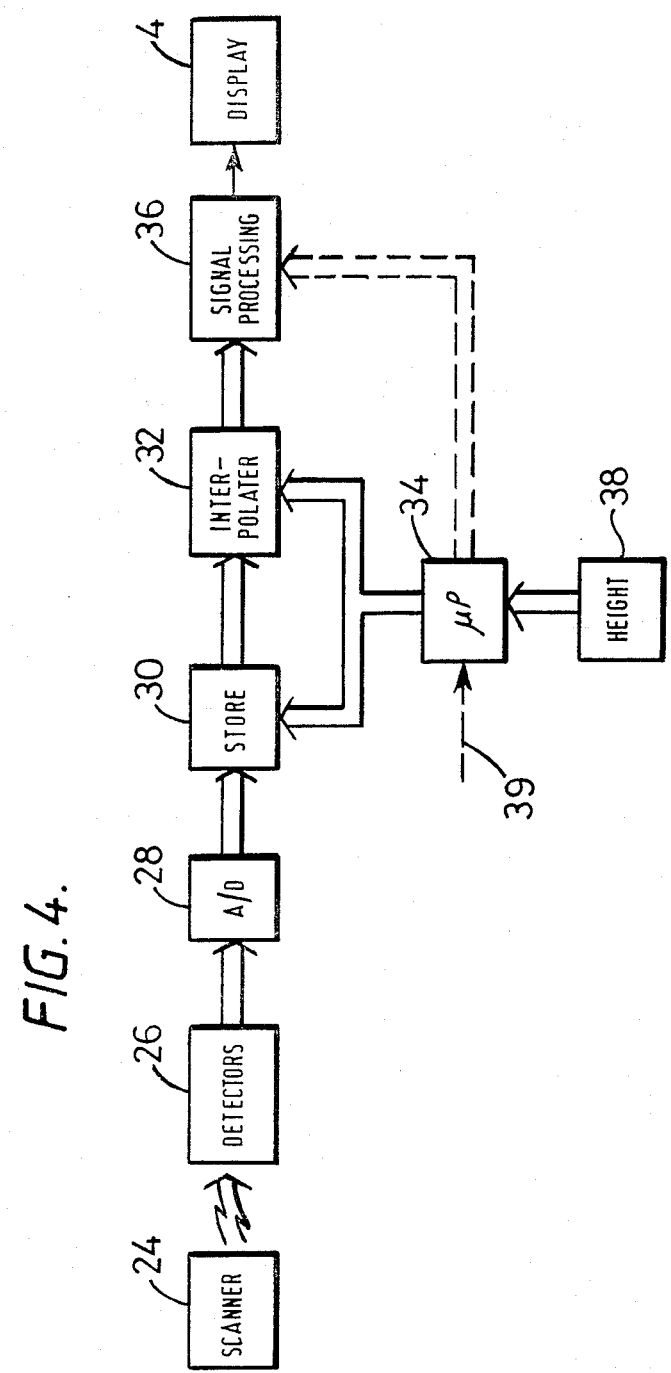
FIG. 4 is a simplified block diagram of an apparatus according to the invention.

With reference to FIG. 4, the thermal imager comprises a scanner 24 which supplies infrared energy to a detector array 26 whose outputs are converted to digital form in the analogue-to-digital converter 28 and stored in a store 30 which stores at least a plurality of lines, or may store one or more frames. The output of the store 30 is supplied to an interpolator 32 under control of a microprocessor 34 which also controls the interpolator 32. The output of the interpolator is supplied to circuitry 36 which performs further signal processing as necessary and supplies video signals to the display 4.

The microprocessor receives information as to the height of the aircraft above ground from a circuit 38, thus providing the values h and e.

The following relationships hold between the symbols illustrated in FIG. 1:

$$r = h/\tan(d) \quad (1)$$

and $$s = \arctan(e/(r-c)) \quad (2)$$

The microprocessor is programmed on the basis of equations (1) and (2) to control the store 30 and interpolator 32 so that the video line seen by the scanner at angle s is displayed at a position corresponding to angle d. Thus, lines on the display below the horizon, such as line 12' and line 18', are effectively moved downwardly to their correct positions, such as the positions 12 and 18. The angular distance d-s through which each line has to be moved downwardly is progressively less the higher the line is up the display. The computer computes this correction for each line.

Figure 5:
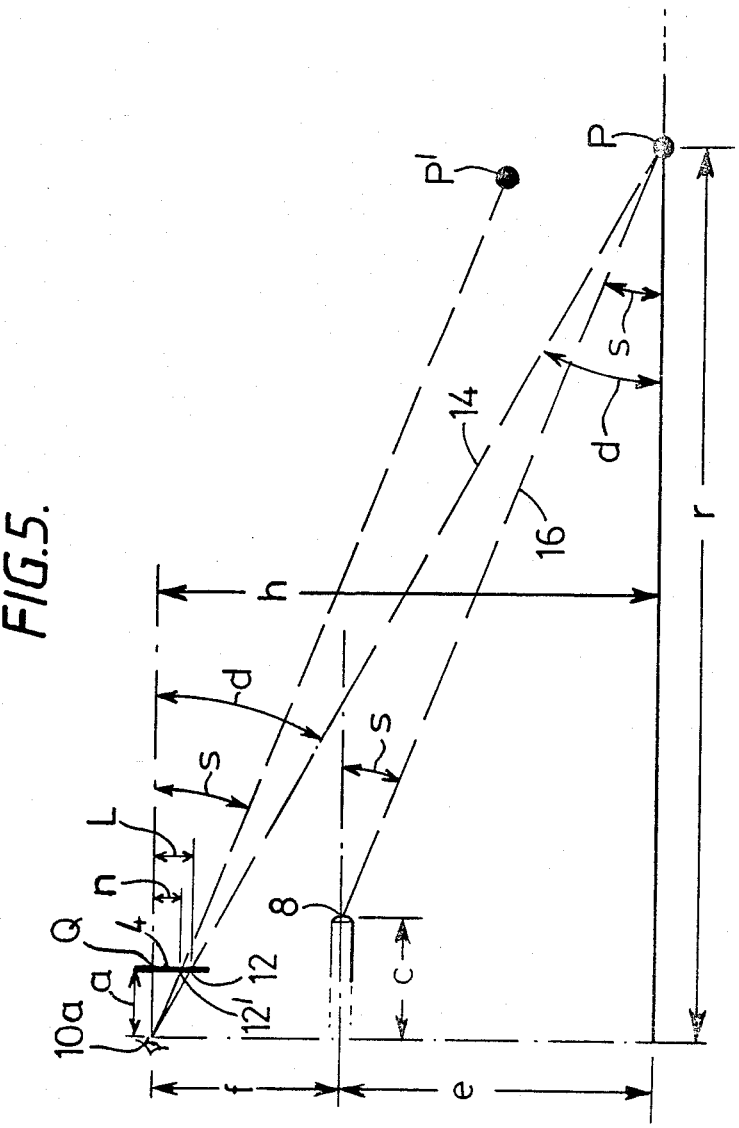
FIG. 5 is a diagram for understanding simplified calculations which may be performed in accordance with an embodiment of the invention for correcting parallax errors.

One example of how this correction may be computed will be understood from FIG. 5 which shows more clearly and in more detail the various angles involved in the arrangement of FIG. 1. For the purpose of explaining the computations, it is assumed that a line joining the pilots eye 10a to a datum point Q on the head-up display 4 is horizontal when the aircraft is horizontal. The apparatus is arranged so that, in the absence of any correction in accordance with the invention, the line 12' (FIG. 2) would be displayed on the display 4 at a distance n below the point Q of the display which satisfies the following relationship:

$$\tan s = n/a$$

where a is the horizontal distance between the pilot's eye 10a and the point Q of the display 4.

Thus, the line joining the pilot's eye 10a to the location 12' on the display 4 is at an angle s below the horizontal and is parallel to the line joining the imager 8 and the point P.

In this way, the microprocessor 34 has sufficient information to determine the location in store 30 which contains the image signals corresponding to location 12' on the display 4 which have to be shifted to location 12. Thus, using the above relationships:

$$n = a \tan s$$
$$= \frac{a \cdot e}{r - c}$$
$$\text{but } r = \frac{h \cdot a}{L}$$

where L is the distance from the point Q of the display 4 to location 12 so that $$n = \frac{e \cdot a}{\frac{h \cdot a}{L} - c}$$

Thus, for each value of L the microprocessor determines n from the above relationship, taking into account the height of the aircraft h. Preferably, the values of n for the different values of h and L are stored in a look-up table. From these values of n the microprocessor accesses the store 30 to derive the lines to be displayed for each value of L. Where n has a value between values representing coincidence with actual video lines, the line to be displayed at position L is derived by interpolating in appropriate proportions from the image signals of the adjacent lines in the store 30. This is the function of the interpolator 32 which accordingly may receive adjacent pairs of line signals from the store 30. In practice, the data required for the interpolation performed using each adjacent pair of video lines from the store 30 may also be obtained from a look-up table (not shown).

Thus, the portion of the image below the horizon is expanded vertically with the amount of expansion being progressively less for each successive higher portion of the image.

The above discussion assumes that the aircraft is horizontal. In practice, account may need to be taken of the possibility that the aircraft is tilted at varying angles to the horizontal. The way in which such tilt may be taken into account will be understood from the following discussion of FIG. 6 in which it is assumed that the aircraft nose is tilted upwardly by an angle x.

As will be understood from consideration of FIG. 6, the above relationships will be modified as follows:

$$\tan(s + x) = \frac{n}{a}$$

Therefore $n = a \tan(s + x)$

-continued $$\text{But } s = \arctan \frac{e'}{r - c'}$$

$$\text{Since } \tan(d + x) = \frac{L}{a}$$

$$d = \arctan \frac{L}{a} - x$$

$$\text{So } \tan d = \tan\left[\arctan \frac{L}{a} - x\right] = \frac{h}{r}$$

$$r = \frac{h}{\tan\left[\arctan \frac{L}{a} - x\right]}$$

Also $c' = (c + f \tan x) \cos x$ and $e' = h - (f \cos x - c' \tan x)$

Thus, utilising these relationships the values of n corresponding to different values of x, L and h can be computed and preferably stored in a look-up table for use by the microprocessor as previously described. Where the angle of tilt x is taken into account, the microprocessor 34 is supplied at input 39 with the value of x from the aircraft instrumentation. Since the height h and the tilt angle x vary relatively slowly in practice, the microprocessor is preferably programmed to compute a new look-up table for the various values of L each time the height h and/or the angle x changes by more than a predetermined amount. This avoids the necessity for a large number of look-up tables each corresponding to a different possible angle of tilt x and/or height h.

Processing is also carried out so as to compress the data horizontally to correct for the error shown in FIG. 3. Thus, for example, lower portions of the image are horizontally compressed more than upper portions to bring the lines 22' into coincidence with the lines 22 shown in FIG. 3, the compression being progressive from one line to the next. The lateral dimension of a feature seen on an uncorrected display is inversely proportional to the distance from the scanner 8 to the feature on the ground. However, in a corrected display, the dimension will be inversely proportional to the distance from the pilot's eye 10a to the feature. Thus, a lateral scaling correction is performed, in the preferred embodiment of the invention, in the signal processing circuitry 36 under control of microprocessor 34. By way of example, the length of each horizontal video line on the display is multiplied by the function:

(e sin d)/(h sin s)

where e, d, h and s are the quantities illustrated in FIG. 5.

Figure 6:
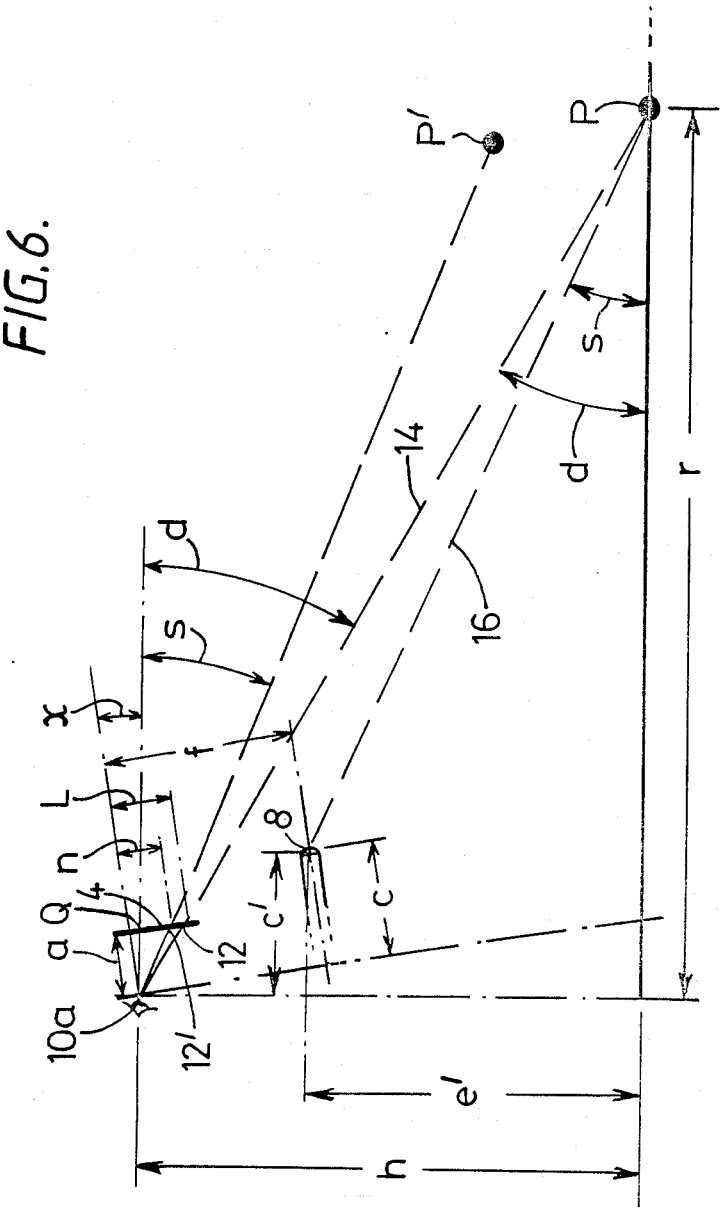
FIG. 6 is a diagram similar to FIG. 5 but is for understanding more complex calculations which are preferably performed in practice in carrying out the invention.

Thus, each video line is compressed by an amount which depends upon the various parameters shown in the drawings, including the height of the aircraft so as, for example, to bring the lines 22' into coincidence with the lines 22 shown in FIG. 3. If desired, and preferably, this compression also takes into account the angle of tilt x, in which case the above function by which the length of each horizontal video line is multiplied becomes:

$$\sqrt{\frac{(e')^2 + (r' - c')^2}{r^2 + h^2}}$$

where the symbols have the meanings shown in FIG. 6.

The processing performed in processing circuitry 36 for achieving this correction is preferably in accordance with the teachings of our UK Published Patent Application No. 2,180,714 in which a read-out of image signals from a store is varied from one line to the next so that a different correction is applied to each line as appropriate. Our published British Patent Application No. 2,180,714 also illustrates a suitable form of thermal scanner which may be employed in the imaging apparatus of the present invention.

Although the invention has been described in relation to a thermal imager with a head-up display on an aircraft, it may be employed in other vehicles and other forms of apparatus. For example, the invention may be used with a scanner sensitive to radiation other than infrared radiation, for example visible light.

Although in the embodiment illustrated in the drawings, parallax correction in the vertical direction has been achieved by an effective progressive expansion of the image, alternative arrangements are possible within the scope of the invention in which a progressive vertical compression of the image is performed, as may be required, for example, if the scanner were mounted at a higher level than the pilot. Similarly, in this case, progressive horizontal expansion would be needed to correct for the type of parallax error illustrated in FIG. 3 since, with the scanner above the level of the pilot, the apparent convergence of the edges of the runway as directly seen by the pilot would be greater than the convergence of the edges of the runway in the displayed image.

Further inputs are preferably provided to the microprocessor containing information on pitch and roll and the above described corrections are preferably performed also as a function of pitch and/or roll.

I claim:

1. Imaging apparatus for producing a video signal for display on a head-up display, comprising imaging means for providing a first video signal corresponding to an image of a field of view, and signal processing means operable to process said first video signal to derive a second video signal for display by the head-up display in which the dimension of the image in at least one direction is progressively varied to compensate at least partially for a difference between the location of the imaging means and the location of the head-up display.

2. Apparatus according to claim 1, wherein said progressive variation is an expansion which is progressively less for each successively higher portion of the image.

3. Apparatus according to claim 1 wherein said signal processing means is operable to derive said second video signal by interpolation from adjacent pairs of lines of said first video signal.

4. Apparatus according to claim 1, for use in an aircraft wherein said signal processing means is arranged to receive a signal representing aircraft height and said variation is carried out as a function of said height representing signal.

5. Apparatus according to claim 1, for use in an aircraft wherein said signal processing means is arranged to receive a signal representing aircraft tilt angle and said variation is carried out as a function of said tilt angle.

6. Apparatus according to claim 1, wherein said image processing means is operable to compress the image horizontally in successive lines progressively.

7. Apparatus according to any preceding claim, in combination with a head-up display arranged to display an image corresponding to said second video signal.

8. Apparatus according to claim 1, wherein said imaging means includes scanning means for scanning a field of view in line scan and frame scan directions.

* * * * *